United States Patent
Jang et al.

(10) Patent No.: US 10,253,167 B2
(45) Date of Patent: Apr. 9, 2019

(54) PREPARING METHOD OF POLYOLEFIN RESIN MONO CHIP AND POLYOLEFIN RESIN MONO CHIP

(71) Applicant: LOTTE CHEMICAL CORPORATION, Seoul (KR)

(72) Inventors: Eun Hwa Jang, Daejeon (KR); Seong-Min Cho, Daejeon (KR); Young-Bum Kim, Daejeon (KR); Byeong Kyu Moon, Busan (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 113 days.

(21) Appl. No.: 15/140,627

(22) Filed: Apr. 28, 2016

(65) Prior Publication Data

US 2016/0326350 A1 Nov. 10, 2016

(30) Foreign Application Priority Data

May 7, 2015 (KR) .................. 10-2015-0063874

(51) Int. Cl.

| | | |
|---|---|---|
| C08K 3/04 | (2006.01) | |
| C08K 7/14 | (2006.01) | |
| C08J 3/12 | (2006.01) | |
| C08J 3/20 | (2006.01) | |
| C08J 5/04 | (2006.01) | |
| C08J 5/10 | (2006.01) | |
| B29B 7/90 | (2006.01) | |
| B29B 9/06 | (2006.01) | |
| B29B 9/14 | (2006.01) | |

(52) U.S. Cl.
CPC .............. *C08K 7/14* (2013.01); *B29B 7/90* (2013.01); *B29B 9/06* (2013.01); *B29B 9/14* (2013.01); *C08J 3/12* (2013.01); *C08J 3/201* (2013.01); *C08J 5/043* (2013.01); *C08J 5/10* (2013.01); *C08K 3/04* (2013.01); *C08J 2323/12* (2013.01)

(58) Field of Classification Search
CPC .................................. C08K 7/14; C08K 3/04
USPC ....................................................... 524/582
See application file for complete search history.

(56) References Cited

U.S. PATENT DOCUMENTS

| | | |
|---|---|---|
| 5,916,953 A | 6/1999 | Jacoby |
| 7,723,413 B2 | 5/2010 | Ishikawa et al. |
| 2003/0148116 A1 | 8/2003 | Adedeji |
| 2007/0207303 A1* | 9/2007 | Lee .............. C08L 23/10 428/292.1 |
| 2010/0140829 A1 | 6/2010 | Bernd |
| 2011/0178229 A1* | 7/2011 | Goda ............. C08J 3/12 524/562 |

FOREIGN PATENT DOCUMENTS

| | | |
|---|---|---|
| EP | 1716579 | 3/2009 |
| EP | 2559710 | 2/2013 |
| JP | 07-286050 | 10/1995 |
| JP | 2001-0106835 | 4/2001 |
| JP | 2004-300293 | 10/2004 |
| JP | 2005-082786 | * 3/2005 |
| JP | 2006-0124454 | 5/2006 |
| JP | 2008-179784 | 8/2008 |
| JP | 2008-179785 | 8/2008 |
| JP | 4515784 | 8/2010 |
| JP | 2010-538104 | 12/2010 |
| KR | 10-2002-0055282 | 7/2002 |
| KR | 10-2003-0013145 | 2/2003 |
| KR | 10-2006-0004163 | 1/2006 |
| KR | 10-2006-0104110 | 10/2006 |
| KR | 10-0638118 | 10/2006 |
| KR | 10-0666769 | 1/2007 |
| KR | 10-0854322 | 8/2008 |
| KR | 10-2011-0076341 | 7/2011 |
| KR | 10-2014-0106950 | 9/2014 |
| KR | 10-1532071 | 6/2015 |

\* cited by examiner

*Primary Examiner* — Deve E Valdez
(74) *Attorney, Agent, or Firm* — Lex IP Meister, PLLC

(57) ABSTRACT

The present invention relates to a preparing method of a polyolefin resin mono chip including: forming a thermoplastic resin composite by impregnating a fiber reinforcing agent having a length of 5 mm to 20 mm into a molten mixture including a propylene homopolymer of which a molecular weight distribution Is 3 to 6, and a colorant, wherein a cooling speed at room temperature of the thermoplastic resin composite is 19° C./min or more. In addition, the present invention relates to a polyolefin resin mono chip including: a thermoplastic resin composite including a polymer substrate including a propylene homopolymer of which a molecular weight distribution is 3 to 6, and a colorant; and a fiber reinforcing agent having a length of 5 mm to 20 mm and impregnated into the polymer substrate, wherein an impact strength measured according to ASTM D256 is 200 J/m or more.

13 Claims, No Drawings

PREPARING METHOD OF POLYOLEFIN RESIN MONO CHIP AND POLYOLEFIN RESIN MONO CHIP

CROSS-REFERENCE TO RELATED APPLICATION

This application claims priority to and the benefit of Korean Patent Application No. 10-2015-0063874 filed in the Korean Intellectual Property Office on May 7, 2015, the entire contents of which are incorporated herein by reference.

BACKGROUND OF THE INVENTION (a) Field of the Invention

The present invention relates to a preparing method of a polyolefin resin mono chip and a polyolefin resin mono chip. More specifically, the present invention relates to a preparing method of a polyolefin resin mono chip having an improved production speed and processability, and a polyolefin resin mono chip having a low specific gravity, exhibiting mechanical properties such as high impact strength, tensile strength, etc., and having a uniform composition.

(b) Description of the Related Art

Recently, a resin composition having a low specific gravity in automobile and electronic fields has been increasingly demanded. The reason is that for example, it is possible to implement lightweight of the automobile when manufacturing an automobile by using the resin composition having a low specific gravity. According to the lightweight of the automobile, acceleration and braking which are basic performances are capable of being increased to maximize an engine efficiency, and burden applied to tires, brakes, and a suspension and a fatigue degree of the driver are capable of being released. In addition, since a weight ratio in which an output is able to bear at least per horsepower is relatively reduced, acceleration performance and athletic performance are capable of being excellently secured as compared to heavy vehicles.

However, in order for the resin having a low specific gravity to be commercially available as a practical product, mechanical strength and processability above a predetermined level should be maintained.

To this end, research into a technology of reinforcing mechanical properties of a polyolefin resin by mixing and stirring a glass fiber with the polyolefin resin which is a universal plastic having excellent chemical resistance and easy formability has been conducted. However, as most of the glass fibers are remarkably damaged in kneading and mixing equipment, the glass fiber having a significantly short length is mixed with the polyolefin resin, such that there is a limitation in improving strength of a product. Further, a processing time for manufacturing a product by mixing the polyolefin resin with the glass fiber is increased, such that there are limitations in that a production speed is reduced, and a manufacturing cost is increased.

Accordingly, it has been demanded to develop a novel resin composition capable of having an appropriate level or more of mechanical properties, particularly, high impact strength while maintaining a low specific gravity, and a preparing method of the resin composition at a rapid speed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a preparing method of a polyolefin resin mono chip having advantages of an improved production speed and processability.

In addition, the present invention has been made in an effort to provide a polyolefin resin mono chip having advantages of a low specific gravity, exhibiting mechanical properties such as high impact strength, tensile strength, etc., and having a uniform composition.

An exemplary embodiment of the present invention provides a preparing method of a polyolefin resin mono chip including forming a thermoplastic resin composite by impregnating a fiber reinforcing agent having a length of 5 mm to 20 mm into a molten mixture including a propylene homopolymer of which a molecular weight distribution is 3 to 6, and a colorant, wherein a cooling speed at room temperature of the thermoplastic resin composite obtained by Equation (1) below is 19° C./min or more.

$$\text{Cooling speed}(°\text{C./min}) = (T_{c1} - T_{c2})(t_{c2} - t_{c1})$$

in Equation 1 above, $T_{c1}$ is a temperature at which crystallization starts, measured by DSC, $T_{c2}$ is a temperature at a time point at which the crystallization has been completed, measured by DSC, $t_{c1}$ is a time at which the crystallization starts, measured by DSC, and $t_{c2}$ is a time at which the crystallization has been completed, measured by DSC.

In addition, another embodiment of the present invention provides a polyolefin resin mono chip including: a thermoplastic resin composite including a polymer substrate including a propylene homopolymer of which a molecular weight distribution is 3 to 6, and a colorant; and a fiber reinforcing agent having a length of 5 mm to 20 mm and impregnated into the polymer substrate, wherein an impact strength measured according to ASTM D256 is 200 J/m or more.

Hereinafter, the preparing method of a polyolefin resin mono chip and the polyolefin resin mono chip according to specific exemplary embodiments of the present invention are described in more detail.

In the present specification, a '(homo)polymer' means a polymer polymerized with only one monomer among ethylene, propylene, and α-olefin.

In addition, in the present specification, an '(olefin)block copolymer' means a copolymer in which ethylene or propylene is copolymerized with α-olefin, that is, a copolymer including a plurality of repeating unit blocks or segments that are distinguishable from each other in the polymer since at least one of physical or chemical characteristics such as a content (molar fraction), crystallization degree, density, melting point, etc., of the repeating units derived from the ethylene or the propylene and the α-olefin, respectively, for example, is different from each other.

According to an exemplary embodiment of the present invention, there may be provided a preparing method of a polyolefin resin mono chip including forming a thermoplastic resin composite by impregnating a fiber reinforcing agent having a length of 5 mm to 20 mm into a molten mixture including a propylene homopolymer of which a molecular weight distribution is 3 to 6, and a colorant, wherein a cooling speed at room temperature of the thermoplastic resin composite obtained by Equation (1) above is 19° C./min or more.

The present inventors confirmed through experiments that when the above-described specific preparing method of the polyolefin resin mono chip is used, total preparing process of the polyolefin resin mono chip may be reduced, and a finally prepared polyolefin resin mono chip may achieve excellent mechanical properties due to a rapid cooling speed of a thermoplastic resin composite formed by melting a mixture including a propylene homopolymer and a colorant, and impregnating a fiber reinforcing agent thereinto, and completed the present invention.

Specifically, since the propylene homopolymer has a characteristic in which a melting viscosity is low, the mixture including the propylene homopolymer and the colorant may have increased liquidity in a molten state, such that a composition thereof may be uniform, and the fiber reinforcing agent may be impregnated into the polyolefin resin mono chip finally prepared so as be more uniform and firm.

Particularly, as the propylene homopolymer has the above-described specific molecular weight distribution, after the fiber reinforcing agent is impregnated into the molten mixture including the propylene homopolymer and the colorant, the mixture may be crystallized at room temperature at a rapid speed, and a reduction in adhesion between the molten mixture and the fiber reinforcing agent may be prevented.

Meanwhile, when a dye or a colorant is added in the existing preparing method of a fiber reinforced thermoplastic resin composite, it is known that mechanical properties of the fiber reinforced resin are significantly deteriorated, and accordingly, it is general to use a composite resin chip obtained by mixing and melt-extruding a resin chip including a fiber reinforcing agent with a colored resin chip including a colorant.

On the contrary, in the preparing method according to an exemplary embodiment of the present invention, due to the above-described characteristic of the propylene homopolymer, even though a mono chip is configured by directly mixing the colorant with the propylene homopolymer in the preparing process rather than applying the colorant to a separate resin chip, the polyolefin resin mono chip to be prepared may have excellent mechanical properties above the same level as a composite resin chip to be prepared by mixing and melting the resin chip including the fiber reinforcing agent with the colored resin chip including the colorant.

The preparing method of the polyolefin resin mono chip may include: forming a thermoplastic resin composite by impregnating a fiber reinforcing agent having a length of 5 mm to 20 mm into a molten mixture including a propylene homopolymer of which a molecular weight distribution is 3 to 6, and a colorant.

A molecular weight distribution of the propylene homopolymer may be 3 to 6, or 5 to 6. The molecular weight distribution means a molecular weight distribution of a polymer material, and means a ratio of a weight average molecular weight to a number average molecular weight (a value of weight average molecular weight/number average molecular weight). As the ratio of the weight average molecular weight to the number average molecular weight is closer to 1, the distribution becomes narrow.

When the molecular weight distribution of the propylene homopolymer is excessively decreased as less than 3, after the fiber reinforcing agent is impregnated into the molten mixture including the propylene homopolymer and the colorant, surface quality may be poor, for example, the adhesion between the molten mixture and the fiber reinforcing agent may be deteriorated, etc., or processability may be reduced since viscosity of the molten mixture is improved. In addition, when the molecular weight distribution of the propylene homopolymer is excessively increased as more than 6, shearing stress is reduced and viscosity is decreased, such that strength of the thermoplastic resin composite may be deteriorated.

The colorant may include carbon black, titanium black, chromium oxide, aniline black, iron oxide, manganese oxide, graphite, or compounds including mixtures of two or more thereof, etc. As the colorant is included, colors depending on usages may be implemented.

The molten mixture may further include at least one additive including impact modifiers, inorganic fillers, UV filters, antioxidants, lubricants, antistatic agents, compatibilizers, fine particles or mixtures of two or more thereof.

The fiber reinforcing agent may have a length of 5 mm to 20 mm, or 9 mm to 13 mm. In addition, the fiber reinforcing agent may have a diameter of 100 μm or less, or 1 μm to 50 μm. Further, the fiber reinforcing agent may further include a functional group on a surface thereof. Examples of the functional group are not significantly limited, but for example, may include an epoxy group, an urethane group, a silane group, an acryl group, or compounds in which two or more thereof are mixed. The fiber reinforcing agent includes the functional group, such that the fiber reinforcing agent may have improved compatibility in a mixing process with the propylene homopolymer.

As the fiber reinforcing agent, for example, a glass fiber, a carbon fiber, a metal fiber, an aramid fiber, a ultra high molecular weight polyethylene fiber, a polyacrylonitrile fiber, an arylate fiber, a polyetherketone fiber, etc., may be used, and preferably, a glass fiber or a carbon fiber may be used.

Further, in the preparing method of the polyolefin resin mono chip, the cooling speed at room temperature of the thermoplastic resin composite obtained by Equation (1) above may be 19° C./min or more, or 19° C./min to 21° C./min. As described above, the thermoplastic resin composite includes a molten mixture of the propylene homopolymer having a molecular weight distribution of 3 to 6 and the colorant, and the fiber reinforcing agent impregnated thereinto, and the cooling speed of the thermoplastic resin composite means a speed at which the molten mixture of the propylene homopolymer having a molecular weight distribution of 3 to 6 and the colorant contained in the thermoplastic resin composite is cooled to a solid state (or a crystallization state) from the molten state.

More specifically, the cooling speed may be calculated by Equation 1 below:

$$\text{Cooling speed}(°\text{C./min}) = (T_{c1} - T_{c2})/(t_{c2} - t_{c1}) \quad \text{[Equation 1]}$$

in Equation 1 above, $T_{c1}$ is a temperature at which crystallization starts, measured by DSC, $T_{c2}$ is a temperature at a time point at which the crystallization has been completed, measured by DSC, $t_{c1}$ is a time at which the crystallization starts, measured by DSC, and $t_{c2}$ is a time at which the crystallization has been completed, measured by DSC.

The $T_{c1}$, $T_{c2}$, $t_{c1}$, and $t_{c2}$ may be measured by DSC equipment, respectively, and the thermoplastic resin composite is in a molten state at a temperature of $T_{c1}$ or higher, and the thermoplastic resin composite is in a solid state (or a crystallization state) at a temperature of $T_{c2}$ or less. More specifically, $T_{c1}$ may mean a temperature of a point at which an exothermic peak starts to appear as a temperature on a DSC curved line data is decreased, and $T_{c2}$ may mean a temperature of a point at which an exothermic peak disappears as a temperature is continuously decreased from the $T_{c1}$, respectively.

When the cooling speed of the thermoplastic resin composite is decreased as less than 19° C./min, it is difficult to conduct formation of sufficient crystal, such that mechanical properties of the polyolefin resin mono chip to be finally prepared may be decreased, and as a cooling time is increased, a production speed in the preparing process of the polyolefin resin mono chip may be decreased and a production cost thereof may be increased.

In addition, the preparing method of the polyolefin resin mono chip may further include pelletizing the thermoplastic resin composite. Examples of the pelletizing the thermoplastic resin composite are not significantly limited, but for example, a method in which the thermoplastic resin composite is cut by a predetermined length by a strand pelletizer equipment according to automated operation at 850 RPM to 1200 RPM through a pulling device, etc., may be used.

Meanwhile, according to another exemplary embodiment of the present invention, there may be provided a polyolefin resin mono chip including: a thermoplastic resin composite including a polymer substrate including a propylene homopolymer of which a molecular weight distribution is 3 to 6, and a colorant; and a fiber reinforcing agent having a length of 5 mm to 20 mm and impregnated into the polymer substrate, wherein an impact strength measured according to ASTM D256 is 200 J/m or more.

The present inventors confirmed from experiments that when the above-described specific polyolefin resin mono chip is used, content of the colorant and the fiber reinforcing agent could be controlled so as not to damage the fiber reinforcing agent and to maintain the long length, such that a specific gravity of the polyolefin resin mono chip could be decreased and impact strength could be improved, and completed the present invention.

The polyolefin resin mono chip according to another exemplary embodiment of the present invention may be obtained by the preparing method of the polyolefin resin mono chip according to the exemplary embodiment of the present invention.

Specifically, since the propylene homopolymer has a characteristic in which a melting viscosity is low, the polymer substrate including the propylene homopolymer and the colorant may have increased liquidity in a molten state, such that a composition thereof may be uniform, and the fiber reinforcing agent may be impregnated into the polyolefin resin mono chip finally prepared so as be more uniform and firm.

In particular, the propylene homopolymer has the above-described specific molecular weight distribution, such that after the fiber reinforcing agent is impregnated into the polymer substrate including the propylene homopolymer and the colorant, a reduction in adhesion between the polymer substrate and the fiber reinforcing agent may be prevented.

Meanwhile, when a dye or a colorant is added in the existing preparing method of a fiber reinforced thermoplastic resin composite, it is known that mechanical properties of the fiber reinforced resin are significantly deteriorated, and accordingly, it is general to use a composite resin chip obtained by mixing and melt-extruding a resin chip including a fiber reinforcing agent with a colored resin chip including a colorant.

On the contrary, in the polyolefin resin mono chip according to an exemplary embodiment of the present invention, due to the above-described characteristic of the propylene homopolymer, even though a mono chip is configured by directly mixing the colorant with the propylene homopolymer rather than applying the colorant to a separate resin chip, the polyolefin resin mono chip to be prepared may have excellent mechanical properties above the same level as a composite resin chip to be prepared by mixing and melting the resin chip including the fiber reinforcing agent with the colored resin chip including the colorant.

In addition, in the case of the composite resin chip prepared by mixing and melting the resin chip including the fiber reinforcing agent with the colored resin chip including the colorant, it is difficult to conduct uniform mixing between the resin chips, such that weight variation may occur, and thus, dimensional variation of finished products may also occur. However, the polyolefin resin mono chip may minimize weight variation and dimensional variation through uniform mixing of the colorant and the propylene homopolymer.

In particular, the polyolefin resin mono chip may include the thermoplastic resin composite including the polymer substrate including the propylene homopolymer of which a molecular weight distribution is 3 to 6, and the colorant; and the fiber reinforcing agent having a length of 5 mm to 20 mm and impregnated into the polymer substrate.

Specifically, the thermoplastic resin composite may include the polymer substrate including the propylene homopolymer of which a molecular weight distribution is 3 to 6, and the colorant.

The polymer substrate means a composite in which a small amount of ceramic material or a metal material or another polymer compound is mixed with a large amount of polymer compound. Examples of a specific state of the polymer substrate are not significantly limited, but for example, the polymer substrate may be in a molten state, a glass transition state, or a solid state (or a crystallization state).

The polymer substrate may include a propylene homopolymer of which a molecular weight distribution is 3 to 6 or 5 to 6, and a colorant. The propylene homopolymer means a polymer compound formed by polymerization among propylene monomers.

The polymer substrate may include a propylene homopolymer of which a molecular weight distribution is 3 to 6. When the molecular weight distribution of the propylene homopolymer is excessively decreased as less than 3, after the fiber reinforcing agent is impregnated into the polymer substrate including the propylene homopolymer and the colorant, surface quality may be poor, for example, the adhesion between the polymer substrate and the fiber reinforcing agent may be deteriorated, etc., or processability may be reduced since viscosity of the polymer substrate is improved. In addition, when the molecular weight distribution of the propylene homopolymer is excessively increased as more than 6, shearing stress is reduced and viscosity is decreased, such that strength of the thermoplastic resin composite may be deteriorated.

A melt index of the propylene homopolymer (measured according to ASTM D1238 at 230° C. and a load of 2.16 kg) may be 28 g/10 min to 50 g/10 min, or 28 g/10 min to 40 g/10 min. The melt index (MI) refers to a flow rate at which materials to be molten are extruded under a predetermined condition by a piston, indicating flow easiness of the materials to be molten. Factors that the most affect to the melt index are a molecular weight and a molecular weight distribution. An example of a measuring method for the melt index is not significantly limited, but for example, the melt index may be measured by a method of ASTM D1238 (measured at a temperature of 190° C. and a load of 2.16 g).

A content of the propylene homopolymer may be 40 wt % to 70 wt %, or 50 wt % to 60 wt % based on a weight of the polyolefin resin mono chip. When the content of the propylene homopolymer is less than 40 wt % based on the weight of the polyolefin resin mono chip, formability of the polyolefin resin mono chip may be decreased. When the content of the propylene homopolymer is more than 70 wt % based on the weight of the polyolefin resin mono chip, impact strength of the polyolefin resin mono chip may be decreased, that is, mechanical properties thereof may be deteriorated.

Further, the polymer substrate includes the colorant, such that the polyolefin resin mono chip may implement various colors depending on usages. Examples of the colorant are not significantly limited, but for example, the colorant may include carbon black, titanium black, chromium oxide, aniline black, iron oxide, manganese oxide, graphite, or compounds containing mixtures of two or more thereof, etc.

Further, the colorant may have a content of 0.1 wt % to 15 wt % based on the weight of the polyolefin resin mono chip. When the content of the colorant is less than 0.1 wt % based on the weight of the polyolefin resin mono chip, coloring of the polyolefin resin mono chip may not be perfect. When the content of the colorant is more than 15 wt % based on the weight of the polyolefin resin mono chip, mechanical properties of the polyolefin resin mono chip may be reduced.

The polymer substrate may further include an additive including impact modifiers, inorganic fillers, UV filters, antioxidants, lubricants, antistatic agents, compatibilizers, fine particles or mixtures of two or more thereof.

The impact modifier may include an olefin block copolymer including ethylene-based repeating units and C4-C30 α-olefin-based repeating units. The olefin block copolymer including the ethylene-based repeating units and C4-C30 α-olefin-based repeating units is included, such that miscibility and impact strength of the polyolefin resin mono chip may be improved.

The ethylene-based repeating unit means a repeating unit included in the ethylene homopolymer prepared by using an ethylene compound as a monomer. In addition, the C4-C30 α-olefin-based repeating unit means a repeating unit included in a homopolymer prepared by using α-olefin compounds such as 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, etc., preferably, 1-butene or 1-octene, as a monomer.

A content of the olefin block copolymer is not significantly limited, but for example, the content of the olefin block copolymer relative to the weight of the polyolefin resin mono chip may be 40 wt % or less, or 0.1 wt % to 40 wt %. When the content of the olefin block copolymer is excessively small, miscibility and impact strength of the polyolefin resin mono chip may be reduced. In addition, when the content of the olefin block copolymer is excessively increased on the basis of a weight of the polyolefin resin mono chip, flexural properties and formability of the polyolefin resin mono chip may be reduced.

A melt index of the olefin block copolymer (measured according to ASTM D1238 at 230° C. and a load of 2.16 kg) may be 2 g/10 min to 20 g/10 min, or 5 g/10 min to 15 g/10 min. The melt index (MI) refers to a flow rate at which materials to be molten are extruded under a predetermined condition by a piston, indicating flow easiness of the materials to be molten. Factors that the most affect to the melt index are a molecular weight and a molecular weight distribution. An example of a measuring method for the melt index is not significantly limited, but for example, the melt index may be measured by a method of ASTM D1238 (measured at a temperature of 190° C. and a load of 2.16 g).

A molar ratio of the ethylene-based repeating units and the C4-C30 α-olefin-based repeating units may be 6:4 to 7:3.

A weight average molecular weight of the olefin block copolymer may be 50,000 g/mol to 180,000 g/mol.

Meanwhile, the thermoplastic resin composite may include a fiber reinforcing agent having a length of 5 mm to 20 mm and impregnated into the polymer substrate. Accordingly, the polyolefin resin mono chip may implement high impact strength together with high rigidity.

The fiber reinforcing agent impregnated into the polymer substrate means a fiber reinforcing agent immersed into the polymer substrate, specifically, a state in which all surfaces of the fiber reinforcing agent contact the polymer substrate.

The fiber reinforcing agent may have a length of 5 mm to 20 mm, or 9 mm to 13 mm. In addition, the fiber reinforcing agent may have a diameter of 100 μm or less, or 1 μm to 50 μm. Further, the fiber reinforcing agent may further include a functional group on a surface thereof. Examples of the functional group are not significantly limited, but for example, may include an epoxy group, an urethane group, a silane group, an acryl group, or compounds in which two or more thereof are mixed. The fiber reinforcing agent includes the functional group, such that the fiber reinforcing agent may have improved compatibility in a mixing process with the propylene homopolymer.

As the fiber reinforcing agent, for example, a glass fiber, a carbon fiber, a metal fiber, an aramid fiber, a ultra high molecular weight polyethylene fiber, a polyacrylonitrile fiber, an arylate fiber, a polyetherketone fiber, etc., may be used, and preferably, a glass fiber or a carbon fiber may be used.

A content of the fiber reinforcing agent may be more than 15 wt %, or 16 wt % to 30 wt %, or 18 wt % to 25 wt % based on the weight of the polyolefin resin mono chip. When the content of the fiber reinforcing agent is 15 wt % or less based on the weight of the polyolefin resin mono chip, mechanical properties of the polyolefin resin mono chip may be deteriorated.

A weight ratio of the colorant and the fiber reinforcing agent may be 1:1 to 1:50, or 1:10 to 1:40, or 1:15 to 1:30.

A weight ratio of the fiber reinforcing agent and the propylene homopolymer may be 1:1.5 to 1:10, or 1:2 to 1:5, or 1:2.5 to 1:3.5. Accordingly, impact strength and flexural modulus of the polyolefin resin mono chip may be improved.

The polyolefin resin mono chip may have a length of 1 mm to 500 mm, or 3 mm to 400 mm, or 4 mm to 100 mm and a cross-sectional diameter of 0.1 mm to 50 mm, or 0.5 mm to 30 mm, or 1 mm to 10 mm, or 2 mm to 5 mm.

When the length of the polyolefin resin mono chip is less than 1 mm, mechanical properties of the polyolefin resin mono chip may be deteriorated. When the length of the polyolefin resin mono chip is more than 500 mm, it may be difficult to input raw materials at the time of secondary formation of the polyolefin resin mono chip.

An impact strength measured according to ASTM D256 of the polyolefin resin mono chip may be 200 J/m or more, or 220 J/m to 350 J/m, or 230 J/m to 320 J/m. The polyolefin resin mono chip may have the above-described range of high impact strength to implement high rigidity of a final product.

Further, a tensile strength measured according to ASTM D638 of the polyolefin resin mono chip may be 50 MPa or more, 55 MPa to 100 MPa, or 60 MPa to 90 MPa. The polyolefin resin mono chip may have the above-described range of high tensile strength to implement high rigidity of a final product.

A specific gravity measured according to ASTM D792 of the polyolefin resin mono chip may be 0.8 to 1.2, or 0.9 to 1.1, or 1.0 to 1.05. The polyolefin resin mono chip may have the above-described range of low specific gravity to implement lightweight of a final product. When the specific gravity of the polyolefin resin mono chip is more than 1.2, it may be difficult to achieve lightweight of the final product.

Further, the cooling speed at room temperature of the thermoplastic resin composite included in the polyolefin resin mono chip may be 19° C./min or more, or 19° C./min to 21° C./min. As described above, the polyolefin resin mono chip may be configured of the thermoplastic resin composite including the polymer substrate including the propylene homopolymer of which a molecular weight distribution is 3 to 6, and the colorant, and the fiber reinforcing agent impregnated into the polymer substrate, wherein the polymer substrate may be in a molten state, a glass transition state, or a solid state (or a crystallization state).

That is, the cooling speed of the thermoplastic resin composite means a speed at which the polymer substrate contained in the thermoplastic resin composite is cooled to a solid state (or a crystallization state) from a molten state.

More specifically, the cooling speed may be calculated by Equation 1 below:

$$\text{Cooling speed}(°\text{C./min}) = (T_{c1} - T_{c2})/(t_{c2} - t_{c1}) \quad \text{[Equation 1]}$$

in Equation 1 above, $T_{c1}$ is a temperature at which crystallization starts, measured by DSC, $T_{c2}$ is a temperature at a time point at which the crystallization has been completed, measured by DSC, $t_{c1}$ is a time at which the crystallization starts, measured by DSC, and $t_{c2}$ is a time at which the crystallization has been completed, measured by DSC.

The $T_{c1}$, $T_{c2}$, $t_{c1}$, and $t_{c2}$ may be measured by DSC equipment, respectively, and the thermoplastic resin composite is in a molten state at a temperature of $T_{c1}$ or higher, and the thermoplastic resin composite is in a solid state (or a crystallization state) at a temperature of $T_{c2}$ or less. More specifically, $T_{c1}$ may mean a temperature of a point at which an exothermic peak starts to appear as a temperature on a DSC curved line data is decreased, and $T_{c2}$ may mean a temperature of a point at which an exothermic peak disappears as a temperature is continuously decreased from the $T_{c1}$, respectively.

When the cooling speed of the thermoplastic resin composite is less than 19° C./min, mechanical properties of the polyolefin resin mono chip to be finally prepared may be decreased, and as a cooling time is increased, a production speed of the polyolefin resin mono chip may be decreased and a production cost thereof may be increased.

Meanwhile, the polyolefin resin mono chip may be configured of a pellet of the thermoplastic resin composite including the polymer substrate including the propylene homopolymer of which a molecular weight distribution is 3 to 6, and the colorant; and the fiber reinforcing agent having a length of 5 mm to 20 mm and impregnated into the polymer substrate. Specific examples of a shape, a size, and color of the pellet are not significantly limited, but an example of a preparing method for the pellet may include a method in which the thermoplastic resin composite is cut by a predetermined length by a strand pelletizer equipment according to automated operation at 850 RPM to 1200 RPM through a pulling device, etc.

The polyolefin resin mono chip may be used for interior and exterior components for automobile such as door modules, crash pads, door trims, instrument panels, bumpers, fillers, etc.

According to the present invention, the preparing method of the polyolefin resin mono chip having improved production speed and processability, and the polyolefin resin mono chip having a low specific gravity, exhibiting mechanical properties such as high impact strength, tensile strength, etc., and having a uniform composition, may be provided.

DETAILED DESCRIPTION OF THE EMBODIMENTS

The present invention is described in more detail in the following Examples. However, the following exemplary embodiments are provided only to illustrate the present invention, and accordingly, the present invention is not limited to the following Examples.

Examples 1 to 2: Preparation of Polyolefin Resin Mono Chip

Each thermoplastic resin composite was prepared by heating at about 300° C. and melting a resin composition in which a propylene homopolymer is mixed with an additive, and impregnating a long glass fiber having a length of 11 mm thereinto. Then, each thermoplastic resin composite was put into a water bath at room temperature, and crystallized, thereby preparing each polyolefin resin mono chip of which a length of the longest axis is 11 mm and a cross-sectional diameter is 3 mm. Here, compositions of each polyolefin resin mono chip were shown in Table 1 below.

TABLE 1

Compositions of polyolefin resin mono chip of Examples

| | Classification | Example 1 | Example 2 |
|---|---|---|---|
| Resin composition | Propylene homopolymer A (wt %) | 58 | 58 |
| | Additive (wt %) | 22 | 22 |
| Glass fiber | Long glass fiber (wt %) | 20 | 20 |

Propylene homopolymer A (MI: 30 g/10 min, MWD[=Mw/Mn]: 5.8)
Additive
Example 1: Carbon black (particle diameter: 50 μm, specific gravity: 1.8) 1 wt %, Rubber A (MI: 12 g/10 min, weight average molecular weight: 105,000 g/mol, Ethylene-1-octene copolymer) 21 wt %
Example 2: Carbon black (particle diameter: 50 μm, specific gravity: 1.8) 1 wt %, Rubber B (MI: 8 g/10 min, weight average molecular weight: 98,000 g/mol, Ethylene-1-octene copolymer) 21 wt %
Long glass fiber: a glass fiber having a cross-sectional diameter of 20 μm and a length of 11 mm
Melt Index (MI) was measured according to ASTM D1238 standard at 230° C. and a load of 2.16 kg.

Comparative Examples 1 to 7: Preparation of Polyolefin Resin Mono Chip

Each polyolefin resin mono chip was prepared in the same manner as Example except for changing the compositions of the polyolefin resin mono chip, as shown in Table 2 below.

TABLE 2

Compositions of polyolefin resin mono chip of Comparative Examples

| | Classification | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Resin composition | Propylene homopolymer A(wt %) | 79 | 58 | 58 | 0 | 0 | 0 | 10 |
| | Propylene homopolymer B(wt %) | 0 | 0 | 0 | 58 | 0 | 0 | 0 |
| | Propylene homopolymer C(wt %) | 0 | 0 | 0 | 0 | 58 | 0 | 0 |
| | Ethylene-propylene copolymer(wt %) | 0 | 0 | 0 | 0 | 0 | 58 | 48 |
| | Additive (wt %) | 1 | 22 | 22 | 22 | 22 | 22 | 22 |
| Glass fiber | Long glass fiber (wt %) | 20 | 0 | 0 | 20 | 20 | 20 | 20 |
| | Short glass fiber (wt %) | 0 | 20 | 20 | 0 | 0 | 0 | 0 |

\* Propylene homopolymer A (MI: 30 g/10 min, MWD: 5.8)
\* Propylene homopolymer B (MI: 25 g/10 min, MWD: 2.9)
\* Propylene homopolymer C (MI: 80 g/10 min, MWD: 6.4)
\* Ethylene-propylene copolymer (MI: 80 g/10 min, MWD: 6.7)
\* Additive
Comparative Example 1: Carbon black (particle diameter: 50 μm, specific gravity: 1.8), Rubber A (MI: 12 g/10 min, weight average molecular weight: 105,000 g/mol)
Comparative Example 2: Carbon black (particle diameter: 50 μm, specific gravity: 1.8), Rubber A (MI: 12 g/10 min, weight average molecular weight: 105,000 g/mol)
Comparative Example 3: Carbon black (particle diameter: 50 μm, specific gravity: 1.8), Rubber B (MI: 8 g/10 min, weight average molecular weight: 98,000 g/mol)
Comparative Example 4: Carbon black (particle diameter: 50 μm, specific gravity: 1.8), Rubber A (MI: 12 g/10 min, weight average molecular weight: 105,000 g/mol)
Comparative Example 5: Carbon black (particle diameter: 50 μm, specific gravity: 1.8), Rubber A (MI: 12 g/10 min, weight average molecular weight: 105,000 g/mol)
Comparative Example 6: Carbon black (particle diameter: 50 μm, specific gravity: 1.8), Rubber A (MI: 12 g/10 min, weight average molecular weight: 105,000 g/mol)
Comparative Example 7: Carbon black (particle diameter: 50 μm, specific gravity: 1.8), Rubber A (MI: 12 g/10 min, weight average molecular weight: 105,000 g/mol)
\* Long glass fiber: a glass fiber having a cross-sectional diameter of 15 μm and a length of 11 mm
\* Short glass fiber: a glass fiber having a cross-sectional diameter of 15 μm and a length of 4 mm
\* Melt Index (MI) was measured according to ASTM D1238 standard at 230° C. and a load of 2.16 kg.

Experimental Example: Measurement of Physical Properties of the Polyolefin Resin Mono Chips Obtained by Examples and Comparative Examples Physical properties of the polyolefin resin mono chips obtained by Examples and Comparative Examples were measured by the following method, and results thereof were shown in Tables 3 and 4.

1. Specific Gravity

Specific gravity of each polyolefin resin mono chip obtained by Examples and Comparative Examples was measured according to ASTM D792 in which specific gravity is calculated by using a difference between a weight measured by hanging each polyolefin resin mono chip on a thin wire and a weight measured by putting each polyolefin resin mono chip in water. Results thereof were shown in Table 3 below.

2. Tensile Strength (MPa)

Each test specimen for polyolefin resin mono chips obtained by Examples and Comparative Examples was prepared, and tensile strength thereof was measured by using a tensile tester according to ASTM D638. Results thereof were shown in Table 3 below.

3. Flexural Modulus (MPa)

Each test specimen for polyolefin resin mono chips obtained by Examples and Comparative Examples was prepared, and flexural modulus thereof was measured by applying force to the center of each test specimen, according to ASTM D790. Results thereof were shown in Table 3 below.

4. Impact Strength (Jim)

Each test specimen for polyolefin resin mono chips obtained by Examples and Comparative Examples was prepared, and Izod impact strength thereof was measured at 23° C. according to ASTM D256. Results thereof were shown in Table 3 below.

TABLE 3

Results of Experimental Examples of Examples and Comparative Examples

| Classification | Example 1 | Example 2 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Specific gravity | 1.03 | 1.03 | 1.03 | 1.03 | 1.03 | 1.03 | 1.03 | 1.03 | 1.03 |
| Tensile strength (MPa) | 67 | 61 | 98 | 29 | 27 | 68 | 60 | 61 | 62 |

TABLE 3-continued

Results of Experimental Examples of Examples and Comparative Examples

| Classification | Example 1 | Example 2 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Flexural modulus (MPa) | 3,501 | 2,937 | 4,940 | 1,999 | 1,938 | 2,880 | 3,150 | 3,060 | 3,050 |
| Impact strength (J/m) | 310 | 240 | 155 | 180 | 189 | 280 | 245 | 265 | 265 |

As shown in Table 3 above, the polyolefin resin mono chips of Examples 1 to 2 had a specific gravity of 1.03, which showed the same level as the polyolefin resin mono chips of Comparative Examples 1 and 7.

Meanwhile, in view of an impact strength, the polyolefin resin mono chip of Example 1 had an impact strength of 310 J/m, and the polyolefin resin mono chip of Example 2 had an impact strength of 240 J/m, that is, the polyolefin resin mono chips of Examples 1 to 2 had high impact strength. On the contrary, the polyolefin resin mono chip of Comparative Example 1 in which the content of the additive is reduced to 1 wt % had an impact strength of 155 J/m, and the polyolefin resin mono chips of Comparative Examples 2 and 3 using the short glass fiber instead of using the long glass fiber had an impact strength of 180 J/m and 189 J/m, respectively, such that it could be confirmed that Comparative Examples had a low impact strength as compared to Examples.

Accordingly, it could be confirmed that the polyolefin resin mono chips of Examples had the long glass fiber and the additive mixed at a predetermined content, such that the impact strength could be remarkably improved.

In addition, the polyolefin resin mono chips of Examples 1 to 2 had a tensile strength of 61 MPa and 67 MPa, respectively, which were higher than those of the polyolefin resin mono chips of Comparative Examples 2 and 3, i.e., 29 MPa and 27 MPa.

Flexural modulus of the polyolefin resin mono chips of Examples 1 to 2 were 2,937 MPa and 3,501 MPa, respectively, which were higher than those of the polyolefin resin mono chips of Comparative Examples 2 and 3, i.e., 1,999 MPa and 1,938 MPa.

Accordingly, it could be confirmed that the polyolefin resin mono chips of Examples used the long glass fiber, such that Examples had significantly improved mechanical properties such as tensile strength and flexural modulus as compared to Comparative Examples 2 and 3 using the short glass fiber.

In addition, upon comparing the polyolefin resin mono chips of Example 1 with the polyolefin resin mono chips of Comparative Examples 4 to 5, it could be confirmed that Comparative Example 4 using a propylene homopolymer having a lower MWD value than that of Example 1 had a flexural modulus of 2880 MPa and an impact strength of 280 J/m, which were reduced as compared to Example 1. Further, it could be confirmed that Comparative Example 5 using a propylene homopolymer having a higher MWD value than that of Example 1 had reduced impact strength as 245 J/m, such that strength was significantly deteriorated.

In addition, upon comparing the polyolefin resin mono chips of Example 1 with the polyolefin resin mono chips of Comparative Examples 6 to 7, it could be confirmed that Comparative Example 6 using an ethylene-propylene copolymer instead of using a propylene homopolymer used in Example 1 had a flexural modulus of 3060 MPa and an impact strength of 265 J/m, which were reduced as compared to Example 1. Further, it could be confirmed that Comparative Example 7 using a blend of a propylene homopolymer and an ethylene-propylene copolymer instead of using a propylene homopolymer used in Example 1 also had a flexural modulus of 3050 MPa and impact strength of 265 J/m, which were reduced as compared to Example 1.

5. Cooling Speed (° C./Min)

A temperature at which crystallization starts (for example, a temperature of a point at which an exothermic peak starts to appear as a temperature on a DSC curved line data is decreased) ($T_{c1}$), a temperature at a time point at which the crystallization has been completed (for example, a temperature of a point at which an exothermic peak disappears as a temperature is continuously decreased from the $T_{c1}$) ($T_{c2}$), a time at which the crystallization starts ($t_{c1}$), and a time at which the crystallization has been completed ($t_{c2}$) were measured by leaving and cooling the thermoplastic resin composites prepared by Examples 1 to 2 and Comparative Examples 4 to 7 at room temperature and using a differential scanning calorimetry (DSC, amount of sample measured: 7.13 mg, increasing temperature to 200° C. at speed of 20° C./min) equipment, respectively, and each cooling speed according to Equation (1) below was calculated therefrom, and was shown in Table 4 below:

$$\text{Cooling speed}(°\text{ C./min}) = (T_{c1} - T_{c2})/(t_{c2} - t_{c1}) \quad \text{[Equation 1]}$$

TABLE 4

Results of Experimental Examples of Examples 1 to 2 and Comparative Examples 4 to 7

| Classification | Example 1 | Example 2 | Comparative Example4 | Comparative Example5 | Comparative Example6 | Comparative Example7 |
|---|---|---|---|---|---|---|
| $T_{c1} - T_{c2}$ [° C.] | 21.77 | 21.11 | 19.80 | 20.80 | 20.98 | 20.85 |
| $t_{c2} - t_{c1}$ [min] | 1.09 | 1.10 | 1.15 | 1.23 | 1.22 | 1.22 |
| Cooling speed [° C./min] | 19.98 | 19.19 | 17.22 | 16.91 | 17.20 | 17.09 |

As shown in Table 4 above, it could be confirmed that the cooling speeds at the time of preparing the polyolefin resin mono chips of Examples 1 to 2 were high as 19.98° C./min and 19.19° C./min, respectively. On the contrary, it could be confirmed that all of the cooling speeds of the polyolefin resin mono chips of Comparative Examples 4 to 7 were less than 18° C./min As described above, it could be confirmed that Examples had the rapid cooling speed at the time of preparing the polyolefin resin mono chip, such that Examples had improved production speed and reduced production cost as compared to Comparative Examples.

What is claimed is:

1. A polyolefin resin mono chip comprising:
a thermoplastic resin composite including a polymer substrate including a propylene homopolymer of which a molecular weight distribution is 3 to 6, an olefin block copolymer including ethylene-based repeating units and C4-C30 α-olefin-based repeating units and a colorant; and a fiber reinforcing agent having a length of 5 mm to 20 mm and impregnated into the polymer substrate,
wherein an impact strength measured according to ASTM D256 is 200 J/m or more,
wherein a content of the propylene homopolymer is 40 wt % to 70 wt %, and a content of the olefin block copolymer is 0.1 wt % to 40 wt % based on a weight of the polyolefin resin mono chip, and a content of the fiber reinforcing agent relative to the polyolefin resin mono chip is 16 wt % to 30 wt %, and
wherein a melt index of the olefin block copolymer (measured according to ASTM D1238 at 230° C. and a load of 2.16 kg) is 2 g/10 min to 20 g/10 min.

2. The polyolefin resin mono chip of claim 1, wherein:
a melt index of the propylene homopolymer (measured according to ASTM D1238 at 230° C. and a load of 2.16 kg) is 28 g/10 min to 50 g/10 min.

3. The polyolefin resin mono chip of claim 1, wherein:
a weight ratio of the fiber reinforcing agent and the propylene homopolymer is 1:1.5 to 1:10.

4. The polyolefin resin mono chip of claim 1, wherein:
a weight ratio of the colorant and the fiber reinforcing agent is 1:1 to 1:50.

5. The polyolefin resin mono chip of claim 1, wherein:
the polymer substrate further includes at least one additive selected from the group consisting of impact modifiers, inorganic fillers, UV filters, antioxidants, lubricants, antistatic agents, compatibilizers, and fine particles.

6. The polyolefin resin mono chip of claim 1, wherein:
a weight average molecular weight of the olefin block copolymer is 50,000 g/mol to 180,000 g/mol.

7. The polyolefin resin mono chip of claim 1, wherein:
a length of the polyolefin resin mono chip is 1 mm to 500 mm, and a cross-sectional diameter of the polyolefin resin mono chip is 0.1 mm to 50 mm.

8. The polyolefin resin mono chip of claim 1, wherein:
a specific gravity measured according to ASTM D792 is 0.8 to 1.2.

9. The polyolefin resin mono chip of claim 1, wherein:
a tensile strength measured according to ASTM D638 is 50 MPa or more.

10. The polyolefin resin mono chip of claim 1, wherein:
a cooling speed at room temperature of the thermoplastic resin composite obtained by Equation (1) below is 19° C./min or more:

$$\text{Cooling speed}(°\text{C./min}) = (T_{c1} - T_{c2})/(t_{c2} - t_{c1}) \quad \text{[Equation 1]}$$

in Equation 1 above,
$T_{c1}$ is a temperature at which crystallization starts, measured by DSC,
$T_{c2}$ is a temperature at a time point at which the crystallization has been completed, measured by DSC,
$t_{c1}$ is a time at which the crystallization starts, measured by DSC, and
$t_{c2}$ is a time at which the crystallization has been completed, measured by DSC.

11. The polyolefin resin mono chip of claim 1, wherein:
the polyolefin resin mono chip is used for interior and exterior components for automobiles.

12. A preparing method of a polyolefin resin mono chip comprising:
forming a thermoplastic resin composite by impregnating a fiber reinforcing agent having a length of 5 mm to 20 mm into a molten mixture including a propylene homopolymer of which a molecular weight distribution is 3 to 6, and a colorant,
wherein a cooling speed at room temperature of the thermoplastic resin composite obtained by Equation (1) below is 19° C./min or more, $$\text{Cooling speed}(°\text{C./min}) = (T_{c1} - T_{c2})/(t_{c2} - t_{c1}) \quad \text{[Equation 1]}$$

in Equation 1 above,
$T_{c1}$ is a temperature at which crystallization starts, measured by DSC,
$T_{c2}$ is a temperature at a time point at which the crystallization has been completed, measured by DSC,
$t_{c1}$ is a time at which the crystallization starts, measured by DSC, and
$t_{c2}$ is a time at which the crystallization has been completed, measured by DSC.

13. The preparing method of claim 12, further comprising: pelletizing the thermoplastic resin composite.

* * * * *